United States Patent Office 3,236,915
Patented Feb. 22, 1966

3,236,915
UNSATURATED POLYESTER RESINOUS COMPOSITION HAVING HIGH STABILITY AND RAPID CURING AT LOW TEMPERATURES USING A MIXTURE OF DIMETHYLANILINE, TRIETHANOLAMINE AND DIPHENYLAMINE
Piero Zanaboni, Milan, Italy, assignor to Montecatini Società Generale per l'Industria Mineraria e Chimica, a corporation of Italy
No Drawing. Filed Apr. 19, 1961, Ser. No. 103,974
Claims priority, application Italy, Apr. 22, 1960, 7,133/60
3 Claims. (Cl. 260—864)

My invention relates to polymerizable polyester resinous compositions which can be cured at low temperatures within very short times to give an insoluble and infusible product.

The polyester resins according to the invention consist of a mixture of the esterification product between dicarboxylic acids, of which one must be unsaturated, and polyhydroxylic alcohols, with a polymerizable vinyl monomer.

More particularly the invention relates to a composition of matter, containing unsaturated polyester resins and a system of polymerization accelerators or promoters. The latter ingredient imparts exceptional stability to the non-catalyzed composition and at the same time facilitates rapid curing at low temperatures when a polymerization catalyst of the peroxide type is added to the composition.

The resinous composition of the present invention can be used in various fields requiring very short curing time, such as molding operations with glass fibers or other fibrous reinforcing means, protecting coatings and paints. The composition can also be advantageously utilized in the field of adhesives more particularly as surfacers and putties for marbles, stoppers for car bodies, adhesives and putties for building coating materials, for outdoor applications and for flooring.

The use of polyester resins in the field of adhesives is known, since polyester resin when applied in liquid state onto more or less porous materials and subjected to a complete curing has excellent adhesive properties.

However, the compositions previously used were cured by polymerization reaction promoted by catalysts of the peroxide type and required relatively long curing time at room temperature. In order to reduce the polymerization or curing time, it was necessary to add accelerators which, however, had a detrimental effect on the non-catalyzed resin stability. Balancing the two requisites, i.e. the high stability of the non-catalyzed resin with a very quick curing of the resin after addition of the polymerization catalyst always represented a great difficulty.

It is an object of the present invention to overcome these difficulties. Users of polyester resin adhesives or putties should have available a material whose application can be carried out as simply and quickly as possible, due to the very different conditions under which they may have to work. In general, the adhesive or putty is prepared by mixing various inert mineral fillers with the polyester resin in order to give the material the desired degree of consistency and adhesively. The mixing is effected with high amounts and the product is then divided in small doses which are then preserved until they are used. The storage can even have a duration of many months. At the moment of use, the user quickly adds the polymerization catalyst to the adhesive and applies the mixture to the part to be sealed; the resin must cure after a very short time.

I have found a new system of polymerization accelerators or promoters which, when added to polyester resins of particular composition, give excellent stability to the non-catalyzed composition and produce a very rapid curing of the resin, when catalyzed with a peroxide catalyst. The system of accelerators used in the present invention consists of a mixture of 3 components.

The individual components provided by the present invention present a more or less pronounced activity as accelerators for the polymerization of polyester resins at room temperature when polymerized by a peroxide catalyst. However, when added singly or as simple couples to polyester resins, they do not show both the desired stabilizing effect and accelerating curing of the resin as soon as the catalyst is added. I have found that this desirable synergistic effect is obtained only by using a system which comprises three given components at the same time.

The first component of the accelerator system, provided for by the present invention, is a tertiary monoamine containing, bound to the nitrogen atoms, two aliphatic radicals selected from the group comprising alkyls, hydroxyalkyls and arylalkyls and one aromatic radical selected from the group comprising aryls, azo-aryls, aminoaryls, hydroxyaryls, aldehydo-aryls, and the relative salts. Examples of this class are dimethylaniline, diethylaniline; dimethyl-p-toluidine, methyl-benzyl-aniline, p-dimethylamino-azobenzene, p-dimethylaminobenzaldehyde. These compounds are known as polymerization accelerators or promoters for polyester resins. Although they promote a rapid curing of polyester resins together with peroxide catalysts, they do not, however, give sufficient stability to the resin which contains them. Moreover, after some time they impart a strong color, generally green or violet, to the polyester resin, which color becomes more and more pronounced with time.

According to the present invention, the amount of tertiary dialkyl-aryl amine used varies from 0.05 to 1% by weight, calculated on the weight of the resin comprising the esterification product and the polymerizable vinyl monomer.

The second component of the accelerator system, provided for by the present invention, is a tertiary alkylamine or a tertiary hydroxy-alkylamine or the relative salts. Examples of this class are triethylamine, tri-isopropylamine, ethyldiethanolamine, triethanolamine. These compounds are known as polymerization accelerators or promoters for polyester resins. They are not, however, very effective in rapidly curing of the resin.

According to the present invention the amount of tertiary alkylamine used varies from 0.5 to 4% by weight calculated on the weight of the resin comprising the esterification product and the polymerizable vinyl monomer.

The third component of the accelerator system provided for by the present invention is represented by a secondary arylamine or a secondary arylalkylamine or secondary arylamines variable substituted in the aryl nucleus. As examples of this class, are diphenylamine and methylaniline and salts thereof. I have found, however, that jointly with the compounds of the two aforementioned classes, they act so as to produce the desirable effect of stabilizing and, at the same time, causing the rapid curing of the polyester resin, when the catalyst is added.

According to the present invention, the amount of secondary arylamine used varies from 0.05 to 1% by weight calculated on the weight of the resin comprising the esterification product and the polymerizable vinyl monomer. The polyester resin suitable for the purposes of the present invention can be any resin obtained by esterification of dicarboxylic acids, of which at least one must be unsaturated, and polyhydroxylic alcohols, and mixed with a polymerizale vinyl monomer.

I have, however, found that best results are obtained with a resin of a particular composition in which triethanolamine in an amount between 1 and 5% by weight (calculated on the total weight of the resin comprising the esterification product and the polymerizable vinyl compounds) is reacted with the other starting materials used in the esterification reaction.

The following examples illustrate the preparation of the polyester resin and the effects caused by the addition of the accelerators.

EXAMPLE 1

Into a suitable reaction flask provided with a stirrer, a thermometer, a condenser and a tube for introducing inert gas, were charged:

| | Grams |
|---|---|
| Triethanolamine | 86 |
| Propylene glycol | 1350 |
| Phthalic anhydride | 1332 |
| Maleic anhydride | 588 |
| Hydroquinone | 0.3 |

$CO_2$ was passed through the reaction mixture in order to maintain an inert atmosphere over the mixture. The reactants, while being agitated, were gradually heated up to 190° C. Heating was continued until the acidity number of 58 was reacted. The time required for this reaction stage was approximately 7 hours.

66 g. of ethylene glycol were introduced into the flask and the heating to 190° C. was continued until an acidity number of 25 was reached. The time required for this second reaction stage was approximately 3 hours. The reaction mixture was cooled at 100° C. and 1280 g. of styrene and 0.3 g. of hydroquinone were mixed with the polyester resin. This resin was called "resin A."

A mixture of dicarboxylic acids comprising an unsaturated dicarboxylic acid and a saturated dicarboxylic acid was used in Example 1. The ratio between unsaturated and saturated dicarboxylic acid can be varied over very wide limits. Polyester resins range from those in which the dicarboxylic acid component is totally represented by an unsaturated dicarboxylic acid to those in which the dicarboxylic acid component is represented by a mixture of unsaturated and saturated dicarboxylic acids in which the saturated dicarboxylic acids represent 70% to 80% of the total amount of dicarboxylic acids used.

Fumaric, aconitic, itaconic, citraconic and mesaconic acid or mixtures thereof, etc. can be used as the unsaturated dicarboxylic acids, in lieu of maleic acid or anhydride. Oxalic, malonic, succinic, glutaric, sebacic, adipic, pimelic, azelaic, isophthalic, tetrahydrophthalic, terephthalic, tetrachlorophthalic and hexachloro-endomethylene-tetrahydrophthalic acid or the like can be used as the saturated dicarboxylic acids, in lieu of phthalic acid or anhydride. It is also possible to use polycarboxylic acids, such as citric or tartaric acid or the like.

Among polyhydroxylic alcohols which can be used for the esterification reaction, besides 1,2-propylene glycol, are ethylene glycol, diethylene glycol, dipropylene glycol, triethylene glycol, 1,2-butandiol, 1,3-butandiol, 1,4-butandiol, 1,6-hexandiol, neopentyl-glycol and the like. Other polyhydroxylic alcohols, such as glycerol, pentacrytritol, sorbitol, mannitol, etc., can also be used.

The polymerizable vinyl monomer which is used in admixture with the esterification product can be methylstyrene, methyl methacrylate, vinyl acetate, acrylonitrile, etc., in lieu of styrene. These polymerizable monomers containing the group $CH_2=C<$ can be used per se or in combination with each other.

The weight ratio between the esterification product and the vinyl monomer can vary between very wide limits so that the esterification product content can be from 10 to 90% of the total weight of the mixture. The esterification product content is preferably 50 to 70% by weight of the total weight of the mixture.

The polymerization inhibitor which is added to the polyester resin in order to prevent gelling can comprise, besides hydroquinone, a number of phenol compounds, e.g. ortho-, meta-, or para-cresol, alkylphenols, and the like. Also catechol, resorcinol or alkyl-derivatives thereof, such as tertiary butylcatechol can be used. Other suitable inhibitors are eugenol, quaiacol, etc. The inhibitor amount can vary from 0.001 to 0.05% by weight, calculated on the total weight of the mixture comprising the esterification product and the polymerizable vinyl monomer.

EXAMPLE 2

Into a suitable reaction flask, provided with a stirrer, thermometer, condenser and a tube for introducing inert gas, were charged:

| | Grams |
|---|---|
| Propylene glycol | 1260 |
| Phthalic anhydride | 1600 |
| Maleic anhydride | 704 |
| Hydroquinone | 0.35 |

The reactants were gradually heated to 190° C. while being agitated, and $CO_2$ was passed through the reaction mixture. The heating was continued until an acidity number of 48 was obtained. The time required for the reaction was about 9 hours. The reaction mixture was cooled to 100° C. and 1540 g. of styrene and 0.35 g. of hydroquinone were mixed with the polyester resin while agitating.

This resin was called "resin B."

EXAMPLE 3

This example illustrates the stability characteristics obtained by using the accelerator system of the present invention.

100 g. of resin A and 100 g. of resin B were mixed with the polymerization accelerators or promoters: dimethylaniline, triethanolamine and diphenylamine, in the amount and manner reported in the following Table 1. The stability data reported in the table relate to accelerated tests carried out at temperatures above room temperature.

It is evident that the stability effect of the present invention derives from the simultaneous use of the three components of the accelerator system.

Table 1

THE EFFECT OF ADDITION OF VARIOUS POLYMERIZATION ACCELERATORS ON THE STABILITY OF POLYESTER RESINS

| Resin | Dimithyl-aniline, percent by weight | Diphenyl-amine, percent by weight | Triethanol-amine, percent by weight | Stability at 73° C., hours (+) | Stability at 52° C., days (+) |
|---|---|---|---|---|---|
| B | 0.15 | | | 8 | Less than 3 days. |
| B | 0.15 | | 4 | 11 | 6 days. |
| B | 0.15 | 0.3 | | 14 | 20 days. |
| B | 0.15 | 0.3 | 4 | 72 | 35 days. |
| A | 0.15 | 0.1 | | 40 | 15 days. |
| A | 0.15 | 0.2 | | 72 | 30 days. |
| A | 0.15 | 0.3 | | 88 | 40 days. |
| A | 0.15 | 0.1 | 2 | 250 | 60 days. |
| A | 0.15 | 0.2 | 2 | 280 | More than 100 days. |
| A | 0.15 | 0.3 | 2 | 300 | Do. |

(+) The stability tests were carried out by placing the 100 g. samples contained in a clear glass bottle in an oven.

EXAMPLE 4

This example illustrates the effect of rapid gelling caused by the use of the accelerators of the present invention, together with a polymerization catalyst.

2 g. of benzoylperoxide were added to 100 g. of resin A and 100 g. of resin B, already mixed with the amine accelerators in the amount and manner shown in the following Table 2.

The gel times were determined by means of a gel timer at 25° C. The data reported in Table 2 show that a faster gelling of the polyester resin is attained by the simultaneous use of the 3 components of the accelerator system of the present invention.

Table 2

THE EFFECT OF ADDITION OF VARIOUS POLYMERIZATION ACCELERATORS ON THE POLYMERIZATION RATE OF POLYESTER RESINS.

[Catalyst: 2% of benzoylperoxide by weight of the resin]

| Resin | Dimethylaniline | Diphenylamine | Triethanolamine | Gel time in minutes at 25° C. |
|---|---|---|---|---|
| B | 0.15 | | | 13 |
| B | 0.15 | | 4 | 9 |
| B | 0.15 | 0.3 | | 8 |
| B | 0.15 | 0.3 | 4 | 7 |
| A | 0.15 | 0.1 | | 9 |
| A | 0.15 | 0.2 | | 8 |
| A | 0.15 | 0.3 | | 6 |
| A | 0.15 | 0.1 | 2 | 8 |
| A | 0.15 | 0.2 | 2 | 6 |
| A | 0.15 | 0.3 | 2 | 5 |

I claim:

1. A highly stable resinous composition capable of quickly curing to an infusible insoluble state in the presence of a peroxide polymerization catalyst, which comprises (1) unsaturated reaction products of polycarboxylic acids and polyhydric alcohols, (2) a polymerizable vinyl monomer containing the $CH_2=C<$ group, (3) a phenol polymerization inhibitor, and (4) a system of polymerization accelerators or promoters consisting of (a) 0.05 to 1% by weight of dimethylaniline, (b) 0.5 to 4% by weight of triethanolamine, and (c) 0.05 to 1% by weight of diphenylamine.

2. A highly stable resinous composition capable of quickly curing to an infusible insoluble state in the presence of a peroxide polymerization catalyst, which comprises (1) an unsaturated polyester resin comprising unsaturated reaction products of polycarboxylic acids and polyhydric alcohols, (2) a polymerizable vinyl monomer containing the $CH_2=C<$ group, (3) a phenol polymerization inhibitor, and (4) a system of polymerization accelerators or promoters consisting of a mixture of dimethylaniline, triethanolamine and diphenylamine.

3. Surfacers or putties comprising an unsaturated polyester resin comprising unsaturated reaction products of polycarboxylic acids and polyhydric alcohols, a polymerizable vinyl monomer, a phenolic polymerization inhibitor, and a polymerization accelerator consisting of 0.05 to 1% by weight of dimethylaniline, 0.5 to 4% by weight of triethanolamine, and 0.05 to 1% of diphenylamine.

References Cited by the Examiner

UNITED STATES PATENTS

| 2,449,299 | 9/1948 | Hurdis | 260—865 |
| 2,452,669 | 11/1948 | Levine | 260—865 |
| 2,480,928 | 9/1949 | Hurdis | 260—866 |
| 2,931,784 | 4/1960 | Raymond | 260—863 |

FOREIGN PATENTS 939,289  1/1956  Germany.

WILLIAM H. SHORT, *Primary Examiner.*